United States Patent [19]

Barber et al.

[11] 4,048,226

[45] Sept. 13, 1977

[54] COPPER CATALYST FOR HYDRATION OF NITRILES TO AMIDES

[75] Inventors: William Austin Barber; John Allan Fetchin, both of Stamford, Conn.

[73] Assignee: American Cyanamid Company, Stamford, Conn.

[21] Appl. No.: 226,863

[22] Filed: Feb. 16, 1972

[51] Int. Cl.$^2$ .................................... C07C 103/133
[52] U.S. Cl. ........................ 260/561 N; 260/557 R; 260/558 R; 260/561 R
[58] Field of Search ..................... 260/561 N, 561 R

[56] References Cited

U.S. PATENT DOCUMENTS

| 3,631,104 | 12/1971 | Habermann et al. | 260/561 N |
| 3,758,578 | 9/1973 | Habermann et al. | 260/561 N |
| 3,766,088 | 10/1973 | Yoshimura et al. | 260/561 N X |
| 3,962,333 | 6/1976 | Yoshimura et al. | 260/561 N |

*Primary Examiner*—Ethel G. Love
*Attorney, Agent, or Firm*—Gordon L. Hart

[57] ABSTRACT

Hydration of nitriles, e.g. acrylonitrile, with water in presence of a catalyst comprising catalytic elemental copper prepared by reduction of a copper compound, e.g. copper sulfate, by means of a solution of soluble strong reducing agent, e.g. aqueous solution of sodium borohydride, is described. The copper is thus produced in very fine particulate form having unusually high catalytic activity by comparison with other copper catalyst. Improvements in the reduction are accomplished in alkaline, (e.g. NaOH), solutions and even further in alkaline solution comprising a reducing sugar, e.g. dextrose, in the solution with the strong reducing agent.

2 Claims, No Drawings

COPPER CATALYST FOR HYDRATION OF NITRILES TO AMIDES

The invention relates to synthesis of amides by the catalytic hydration of a nitrile with water in presence of a heterogeneous solid catalyst.

In the prior art several solid materials have been described for use as heterogeneous catalysts in the hydration of nitriles. Among the materials already described for such use are manganese dioxide, Adkins catalyst, Raney copper, etc.

Japanese Patent Application No. 44-59021, dated July 24, 1969, described the hydration of acrylonitrile with water in presence of a catalyst containing copper to produce acrylamide. Raney copper and copper produced by reduction with zinc or with hydrogen were described as suitable catalysts.

According to the invention, as especially active catalyst for the hydration of nitriles with water is elemental copper which has been prepared by the reduction of a copper compound with soluble reducing agent, such as a borohydride reducing agent in aqueous solution. In certain preferred embodiments, catalytic copper of high activity is produced in finely divided particulate form by the reduction of a dissolved copper compound, e.g. sulfate, chloride, or nitrate of copper, or a soluble complex of copper by means of a dissolved borohydride reducing agent such as sodium borohydride or the like.

In other embodiments, insoluble copper compounds e.g. cupric oxide or copper hydroxide are reduced to copper by an aqueous borohydride solution or other aqueous solution of a soluble reducing agent which is applied directly to the copper oxide or the like.

A substantial molar excess (e.g. 2 moles or more) of the borohydride reducing agent with respect to one mole copper, can be used for the copper reduction step but it is found that the effectiveness of the borohydride reducing agent is improved in alkaline solutions and even more so in alkaline solutions which also contain a reducing sugar such as dextrose because in such solutions reduced amounts of borohydride are required to effect the necessary reduction of a given amount of copper.

The present invention employs, as the specific catalyst, elemental copper that has been produced by the reduction of a copper compound with a solution of borohydride or other soluble reducing agent. While the copper compound to be reduced may be a compound that is insoluble in the borohydride solution, such as cupric oxide or cupric hydroxide, it is preferred to reduce a soluble copper compound such as copper sulfate, which can be dissolved in water and combined with an aqueous solution containing the dissolved reducing agent to effect the reduction and precipitation of copper from solution. Cuprous and cupric compounds are both suitable for reduction to the catalytic copper. When a soluble copper compound is reduced from solution the catalytic copper precipitates as flocculent particles. Examination of these particles by electron microscopy reveals they are loose aggregates of much smaller particles of size in the magnitude of 40–1000 Angstroms. This extremely fine particulate copper can be separated, washed and used directly as the catalyst for the hydration reaction. Copper catalysts prepared by reduction with borohydride at lower temperatures are found to possess catalytic activity for the nitrile hydration reaction, which catalytic activity is quite superior to the activity of Raney copper or copper catalysts which have been prepared by reduction with hydrogen and as compared with catalysts containing elemental copper which have been made by reduction with any of several other reducing agents which are described in the prior art for use in the same catalytic reaction.

Selectivity of the conversion of a nitrile to the corresponding amide using the present catalysts is very high, in some instances approaching 100 percent selectivity of conversion to the amide. In the case of acrylonitrile the selectivity of conversion appears to be near 100 percent selective to acrylamide. Occasional instances of only very slight conversion to $\beta$-hydroxypropionitrile or other by-products may be observed, for example, in instances where the preferred catalyst has not been prepared under optimum conditions.

Reaction conditions for carrying out the hydration reaction, except for the selected catalyst, do not need to differ substantially from those described in prior art relating to similar catalytic hydration of nitriles using other solid catalysts. For example, the catalytic copper can be substituted for the catalysts described in the examples of U.S. Pat. No. 3,631,104, patented Dec. 28, 1971. The hydration is carried out with the nitrile preferably in liquid solution with water present. In less preferred embodiments a gas mixture of the reactants might be contacted with the catalyst to effect hydration. In the case of hydration of acrylonitrile, an aqueous liquid solution of the nitrile is a most convenient reaction mixture. The ratio of reactants does not appear to be critical; in the most preferred embodiments there will usually be an excess of water which serves as reactant and solvent but the excess of water is not necessary. With difficulty soluble nitriles a cosolvent may be used, such as an alcohol, to help solubilize the nitrile reactant. The temperature of reaction is not critical but the reaction rate will usually increase with increase in temperature so it is in most cases preferable to operate the reaction at a selected reaction temperature as high as possible consistent with keeping the reactants in liquid phase. Similarly, pressure is not critical to the reaction and the hydration can be carried out quite satisfactorily at atmospheric pressure or at an elevated autogenic pressure which may be preferred to permit high reaction temperature and to maintain a liquid reaction mixture at such temperature. For the hydration of acrylonitrile, any selected reaction temperature in the range from about 0° to about 200° C. may be used; we prefer to operate at temperature in the range from about 30° to about 125° C. at autogenic pressure.

The hydration reaction is operable within a broad range of catalyst concentrations; generally there will be observed an increasing rate of conversion as the catalyst concentration is increased. Catalytic amounts are effective. It is preferable, because of the reduced state of the catalyst, to operate the reaction away from air or oxidizing agents which tend to quickly spoil the catalyst activity by surface oxidation.

The most preferred embodiments of the invention involve the hydration of acrylonitrile, and the invention will be illustrated in more detail in the examples below using acrylonitrile, but the selected catalyst according to the invention will be found useful for the catalytic hydration of other nitriles such as other aliphatic, cycloaliphatic, heterocyclic and aromatic nitriles employing the same principles that are illustrated in the examples below using acrylonitrile or with variations to suit the particular properties of the selected nitrile. The hydration reaction is quite selective to the hydration of the cyano group and only very small proportions, or practically none in some instances, of other hydration products or other side-reaction products might be encountered. In its broader aspects the invention can be used for the hydration of any from the entire class of organic nitriles, a large number of which are named in U.S. Pat. No. 3,366,639, patented Jan. 30, 1968 for Synthesis of Amides From Nitriles.

The reaction product is readily separated from an aqueous reaction mixture by conventional separation steps. In the case of an acrylamide product, in some instances, it may be recovered as an aqueous solution for further processing to produce polyacrylamide, without need to separate the amide product from the water of the reaction product mixture. Since the catalyst is an insoluble solid it is quite easily separated from the liquid reaction product mixture as by filtration, centrifuge or the like. When a purified amide product is desired it is easily isolated by conventional procedures, e.g. by evaporation and recrystallization or by other methods of choice. Any unconverted acrylonitrile can be separated from the product and recycled to the reactor by conventional techniques.

EXAMPLE 1

Catalyst Preparation

A. A solution of 3.9 grams $CuSO_4.5H_2O$ in 100 ml water is added rapidly to a solution of 4.0 grams $NaBH_4$ in 200 ml water at room temperature. Rapid evolution of hydrogen occurs with the prescipitation of fluocculent black precipitate containing 1 gram of copper having particle sizes ranging from 40–1000 Angstroms up to aggregates approximately 250 microns. The solids are filtered and washed with water.

B. Same as A except using only 1.2 grams $NaBH_4$ in an aqueous solution chilled in an ice bath.

C. A 1-gram sample of Raney copper as obtained commercially is used for comparison D. A 1-gram sample of Adkins-type catalyst (commercial copper chromite) was reduced in an atmosphere of 5% $H_2$-95% $N_2$ at 175° C. for 6 hours for use in comparison tests.

E. A 1-gram sample of reduced copper chromite is prepared by reacting 1 gram copper chromite with 2 grams $NaBH_4$ in water at room temperature. The solid catalyst is filtered and washed.

F. A solid particulate catalyst consisting of one gram of 50% by wt. CuO on 50% by wt. $Al_2O_3$ support is treated to reduce the copper oxide with two grams of $NaBH_4$ dissolved in 100 ml water at room temperature. The alumina is not reduced and serves as a catalyst support.

G. To a 25 ml aqueous solution containing 3.93 g $CuSO_4.5H_2O$ is added 4.50 g $NaH_2PO_2 . H_2O$. The mixture is reacted at 71° C. in a water bath for 16 minutes. A precipitate of CuH is formed which quickly decomposes to a copper product containing 1 gram copper.

H. Same as B except instead of 1.2 gram $NaBH_4$ in 200 ml water there is substituted 0.66 gram $NaBH_4$ and 0.64 gm NaOH in 100 ml water chilled in an ice bath.

J. Same as A except instead of 4.0 gram $NaBH_4$ in 200 ml water there is substituted a 150 ml aqueous solution of 0.5$N$ NaOH containing 0.85 gm aluminum powder. After addition of the copper sulfate the mixture is stirred for one-half hour during which time 0.85 gm additional aluminum powder is added gradually. The black solid product containing one gram copper is filtered and washed.

K. To a 100 ml $H_2O$ solution containing 2.83 g dextrose and 2.51 g NaOH was added 3.93 g $CuSO_4.5H_2O$ in 50 ml $H_2O$ under argon chilled in an ice bath. After the mixture became fairly homogeneous (deep blue-violet), 0.20 g $NaBH_4$ in 10 ml of 0.5$N$ NaOH, 40 ml $H_2O$ was added and stirred for 15 minutes.

Hydration Reactions

The washed precipitate prepared in Example 1-A above is placed in a reaction tube containing 5.0 gm water and 0.30 gm acrylonitrile. The mixture is shaken for 1 hour at 57° C. The tube is then emptied and its liquid contents are analyzed by vapor phase chromatography to determine the percent conversion of acrylonitrile to acrylamide. The same procedure is repeated several times but using in successive runs each of the catalysts prepared in Examples 1-B through J. Results of the reactions are tabulated in Table I.

TABLE I

| Catalyst from Example 1 | | Percent conversion of acrylonitrile to acrylamide |
|---|---|---|
| A. | Borohydride-reduced copper from solution | 70 |
| B. | Borohydride-reduced copper from solution | 72 |
| C. | Raney copper, commercial | 22.3 |
| D. | Copper chromite treated in $H_2$—$N_2$ atmosphere | 37.2 |
| E. | Copper chromite treated with borohydride | 43.7 |
| F. | Copper on alumina reduced from oxide by borohydride | 25.9 |
| G. | Copper reduced from solution with $NaH_2PO_2$ | 31.4 |
| H. | Copper reduced from alkaline borohydride solution | 85.7 |
| J. | Copper reduced from alkaline solution by aluminum | 48.4 |
| K. | Copper reduced from alkaline borohydride solution with dextrose present in solution. | 83.8 |

The results tabulated in Table I demonstrate the significantly better conversion obtained with copper catalyst reduced by borohydride. The best conversion rate in the above series was obtained with copper reduced from an alkaline solution of borohydride. This preferred embodiment has the further advantage that less borohydride is used for the reduction than is needed for the reduction without alkali in solution. Use of dextrose in the alkaline borohydride solution (K) further reduced the amount of borohydride needed to produce catalyst of near equivalent activity. The catalyst sample prepared by reduction of the cupric oxide-aluminum oxide mixture (F) contained less than one-half as much of the active copper catalyst as the other samples, yet its conversion rate compared favorably with the Raney copper catalyst. Higher copper catalyst concentration would have increased the percent conversion in Example 2 using this catalyst reduced from cupric oxide.

EXAMPLE 2

Ten grams of copper catalyst prepared as in Example 1-B was placed in a packed bed continuous catalytic reactor. An aqueous solution of 6.8–6.9% by weight acrylonitrile was passed continuously through the reactor for a period of several days at feed rates and temperatures shown in Table II. Percent conversions of acrylonitrile to acrylamide, obtained by analysis of samples taken at the times shown after beginning of the continuous run, are tabulated in Table II.

TABLE II

| Hours continuous running from start when sample taken | Temp. °C. | Wt. percent acrylonitrile in feed | Feed rate grams solution/hr. | Percent conversion |
|---|---|---|---|---|
| 150 hrs. | 80 | 6.8 | 45 | 90 |
| 770 hrs. | 75 | 6.9 | 44 | 55 |
| 1600 hrs. | 85 | 6.9 | 90.6 | 50 |

EXAMPLE 3

In a 500 ml stirred tank continuous reactor, was placed 40 gm of catalyst prepared as in Example 1B. The reactor was operated with continuous feed of acrylonitrile in water with the operating conditions varied during several periods of the continuous catalyst use as tabulated in Table III. Percent conversions of arcylonitrile to acrylamide, obtained by analyses of samples taken at several points of time during the continuous run, are also tabulated in Table III.

TABLE III

| Hours continuous running from start when sample taken | Temp. °C. | Wt. percent acrylonitrile in feed | Residence time (hrs.) | Percent conversion |
|---|---|---|---|---|
| 4.5 hr. | 85 | 9.6 | 0.8 | 46 |
| 55 hrs. | 85 | 19.0 | 2.2 | 43 |
| 116 hrs. | 75 | 19.6 | 2.2 | 22 |

In still other embodiments, the catalyst can be prepared by precipitation of the copper from solution directly onto a catalyst support using any suitable catalyst support such as cellulose, alumina, carbon, clay, diatomaceous earth and the like.

EXAMPLE 4

Example 1-K above is repeated except only one-half the amounts of the borohydride sodium hydroxide, dextrose and copper salt reagents are used and one gram of alumina particles are stirred in the reaction mixture during the reduction step. The product is a supported catalyst consisting of one-half gram catalytic copper on 1 gram of alumina support.

The catalyst is separated, washed and stirred into a solution of 0.30 gm acrylonitrile in 5.00 gm water. Catalytic hydration is carried out for 1.0 hour at 57° C. Conversion to acrylamide is 65%.

EXAMPLE 5

Example 4 is repeated except instead of reducing the reagent to one-half, the sodium hydroxide, dextrose and copper sulfate are reduced to one-eighth and the sodium borohydride to one-fourth the amounts used in Example 1-K. Also instead of the alumina support, there is present in the reaction medium 0.50 gm hydrocellulose. The catalyst product consisting of one-eighth gram copper on one-half gram hydrocellulose is separated, washed and used as in Example 4 as a catalyst for hydration of acrylonitrile. Conversion to acrylamide is 45.3% at the end of 1 hour.

EXAMPLE 6

A suitable catalyst is prepared by reduction of undissolved copper hydroxide with a borohydride solution. In 150 ml water is dissolved 1.26 gm NaOH, 2.83 gm dextrose and 0.30 gm NaBH$_4$. The solution is purged with argon and chilled in an ice bath. While still in the ice bath there is stirred into the solution 1.532 gm Cu(OH)$_2$ and the suspension is stirred for 17 minutes. The copper product is separated, washed and used as a catalyst for hydration of acrylonitrile as in Example 4. A 70% conversion to acrylamide is found at the end of one hour reaction time.

In the foregoing examples the invention is illustrated by description of the most preferred reducing solutions viz. sodium borohydride and sodium hypophosphite but it is within the scope of the invention to produce a finely divided catalytic copper having high catalytic activity by means of solutions of other soluble reducing agents. While water is our most preferred solvent for the reducing agent, other solvents could be used to dissolve the reducing agent and such other solutions could be used instead of the preferred aqueous solutions for making catalytic copper. For the hydration reaction it is necessary to have water present as a reagent and excess water is a convenient solvent for the reaction of many nitriles. In the case of nitriles more difficultly soluble in water it may be desirable to employ an inert cosolvent such as an alcohol or the like to promote solubility of the reagents. These and other variations and modifications of the invention though not expressly described herein are contemplated within the broader scope of the invention as it is defined in the claims.

We claim:

1. In a process for hydration of acrylonitrile to acrylamide wherein acrylontrile and water are reduced in contact with a solid heterogeneous catalyst comprising elemental copper as the active catalytic agent, the improvement wherein said copper catalytic agent consists esstentially of reduced copper produced by reduction of a copper sulfate salt in aqueous solution with a borohydride reducing agent in aqueous alkaline solution.

2. An improved process defined by claim 1 wherein the aqueous borohydride solution is a solution of sodium borohydride.

* * * * *

UNITED STATES PATENT OFFICE
CERTIFICATE OF CORRECTION

Patent No. 4,048,226             Dated September 13, 1977

Inventor(s)  WILLIAM AUSTIN BARBER and JOHN ALLAN FETCHIN

It is certified that error appears in the above-identified patent and that said Letters Patent are hereby corrected as shown below:

Column 6, line 42, delete "reduced" and insert -- reacted -- .

Signed and Sealed this

Third Day of January 1978

[SEAL]

Attest:

RUTH C. MASON
*Attesting Officer*

LUTRELLE F. PARKER
*Acting Commissioner of Patents and Trademarks*